April 24, 1934.   E. L. HALL   1,956,284
PRODUCTION OF OIL GAS AND WATER GAS
Filed Dec. 29, 1928
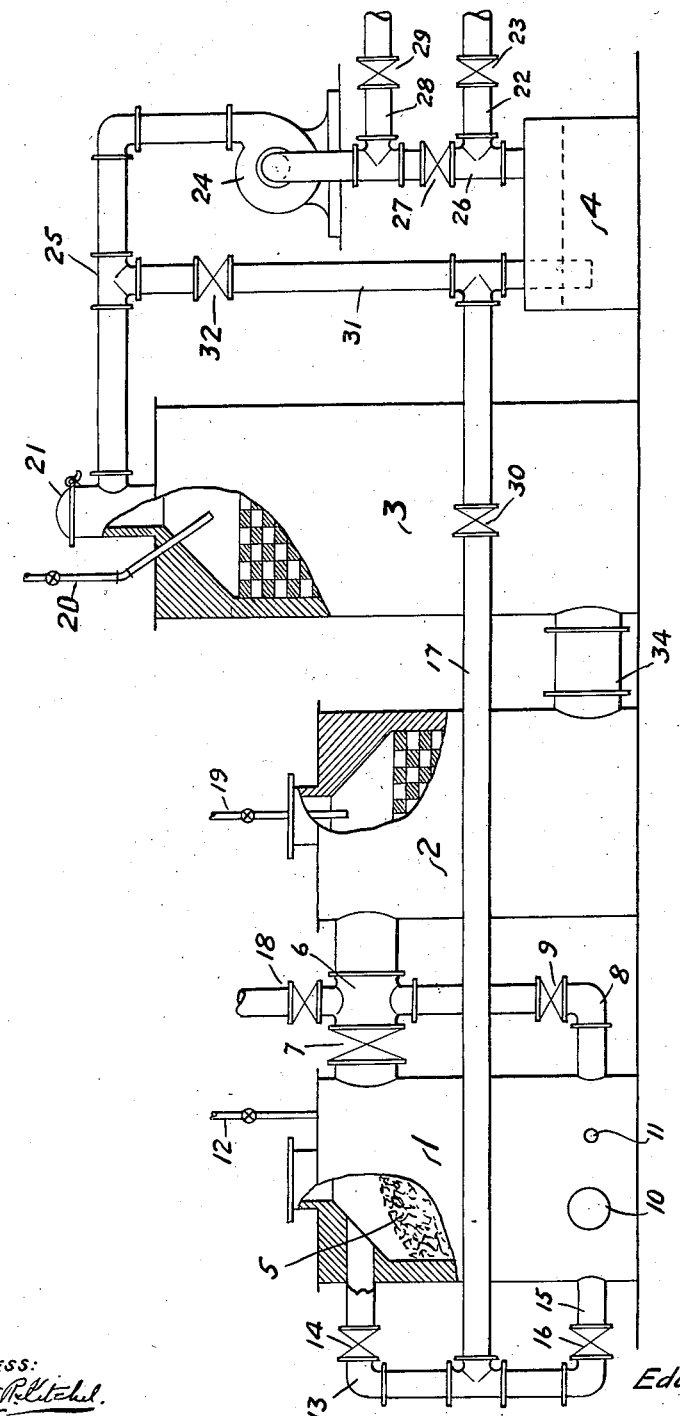
WITNESS:
INVENTOR
Edwin L. Hall
BY
Augustus B. Stoughton
ATTORNEY.

Patented Apr. 24, 1934

1,956,284

UNITED STATES PATENT OFFICE 1,956,284

PRODUCTION OF OIL GAS AND WATER GAS

Edwin L. Hall, Philadelphia, Pa., assignor to The United Gas Improvement Company, Philadelphia, Pa., a corporation of Pennsylvania Application December 29, 1928, Serial No. 329,092

2 Claims. (Cl. 48—208)

The present invention relates to the production of a mixed oil gas and water gas by cracking oil gas with the deposition of carbon, and by the generation of water gas in an ignited fuel bed by air and steam blasting.

More particularly it relates to the application of the above steps to the utilization of liquid hydrocarbons, as gas oil, for instance, in the production of such mixed gas of low specific gravity in apparatus similar to present carburetted water gas apparatus and consisting preferably of a generator, carburetter and superheater connected in series.

According to the process upon which the present invention is an improvement, an ignited fuel bed is provided in the generator by intermittently blasting with air. The blast gases pass through the carburetter and superheater and their heat is stored therein. Intermittently between air blasting operations, the stored heat in the carburetter and superheater is utilized to vaporize, or vaporize and partly crack, the oil. The resultant oil vapors or/and oil gas are then passed through the generator fuel bed to complete their cracking to the desired extent, the excess carbon being deposited in the fuel bed and the resulting gas is saved. Also between air blasting operations or after one or more cycles of air blasting and oil gas passage, the generator fuel bed is blasted with steam to produce blue water gas, which operation utilizes the deposited carbon unconsumed by the blast and keeps the fuel bed free and open. This blue gas may or may not be carburetted with oil in the carburetter and superheated.

It has been previously proposed in the operation of the above process to admit steam to the oil vaporizing vessel simultaneously with the oil, to act as a carrier for the oil vapors and to prevent their overcracking in the vaporizing and fixing vessels, prior to their passage through the fuel bed. In such case, the steam passes through the fuel bed with the fixed oil gas and reacts with the fuel to form water gas which is produced simultaneously with the reformed gas.

Increase in the rate of oil admission and vaporization requires, in such case, increase in the carrying steam and therefore increase in the amount of water gas produced in the generator. It may not be at all desirable where large quantities of oil are to be vaporized and the resulting oil gas reforms to have a proportionate increase in the water gas produced, when an increase in the oil gas is desired. Moreover, the water gas reaction being strongly endothermic, variation by this method of the oil vaporization has a marked effect on generator fire conditions.

It is the object of the present invention to provide a method whereby the oil vapors are provided with a carrying and protecting vehicle, but whereby the oil vaporization and subsequent cracking may be widely varied without a proportionate variation in water gas production, and without such a marked effect upon generator fire conditions.

The invention will be described in connection with the single figure of the accompanying drawing, which forms a part of this specification and which shows a partial vertical cross section and partial elevation of apparatus, chosen for illustration, on which it may be performed.

Referring to the drawing, 1 is a water gas generator, 2 a carburetter, 3 a superheater, and 4 a wash box, of usual carburetted water gas apparatus construction. The water gas generator is provided with the fuel bed 5, and is connected to the carburetter, above the fuel bed, by the connection 6 provided with the valve 7. Below the fuel bed the generator is connected to the carburetter by the connection 8, provided with valve 9. The generator is provided with air blast supply means 10 for up-blasting, and with the steam supply means 11 and 12 for up and down steaming respectively. The generator is further equipped with the offtake 13, provided with the valve 14, leading from above the fuel bed, and the generator is also equipped with the off-take 15 provided with the valve 16, leading from below the fuel bed. These offtakes lead through connection 17 to the wash box.

The carburetter is provided with the secondary air blast supply means 18, and may also be provided with the oil supply means 19. The carburetter is in communication by 34 with the superheater which is provided with the oil supply means 20 and the stack valve 21. 22 is the gas offtake provided with valve 23 from the wash box to means of storage such as a gas holder, not shown. 24 is a means illustrated such as a fan, for circulating gas which has been discharged from the wash box, through the superheater, carburetter and generator, by way of the connection 25. Connection 26, provided with valve 27, and leading from the wash box to the fan may be provided, or connection 28 provided with the valve 29, leading from beyond the condensers (not shown) or from storage may be provided instead, or both may be provided if desired.

In operation, coke is changed into the water gas generator and a solid fuel bed formed which is blasted with air, the resultant blast gases being burned in the carburetter and superheater and their heat stored therein. During this operation valves 7 and 21 are open, valves 30 (in the connection 17), 9, 29 and 27 are closed. The blasting operation may be followed either by a water gas production step or by a reformed oil gas production step. Assuming that the former is the case, and that an uprun is to be made, and the resulting gas carburetted, valve 7 is opened, valve 21 is closed, valve 23 is open and so is valve 32 (in connection 31). Steam is admitted to the generator through supply means 11 and the resultant water gas passes through the carburetter, where it is carburetted by oil supplied at 19, and thence through the superheater, and connection 31 to the wash box and thence to storage. A step of reformed oil gas production may then follow. Oil is admitted to the superheater through supply means 20 with valve 32 closed, as well as valve 27, and the fan 24 is operating, carbureted water gas may be withdrawn from storage through connection 28, valves 29 and 30 being opened; and passed together with the oil vapors produced in the superheater, through the superheater, and carburetter and from thence either up or down or alternately up and down, through the solid fuel bed in water gas generator depending on the operation of the valves 7 and 9, and valves 14 and 16.

The oil is vaporized in the superheater, the resultant vapors are fixed in the superheater base and carburetter and the resultant oil gas cracked to the desired extent in the fuel bed, depositing the excess carbon therein. The reformed gas passes from the generator through connection 17 to the wash box and thence to storage.

The recirculated gas serves as an efficient carrier for the oil vapors and protects them from overcracking in the superheater and carburetter, without the simultaneous production of water gas during the passage through the fuel bed. The rate of oil admission and reformed oil gas production may be widely varied with simultaneous variation in the rate of gas recirculation, without effecting the generator fuel bed conditions to anywhere near the same extent as when steam is used as a carrier. In the utilization of large quantities of oil it is desirable to limit the water gas production as much as possible. According to the present method it may be limited if desired, to that amount necessary to consume the deposited carbon unconsumed by the blast, at the same time an efficient carrier for the oil vapors is provided.

If desired the gas may be recirculated from the outlet of the wash box instead of from storage, by employing connection 26, valve 27 being open and valve 29 in connection 28 closed.

Down runs with steam supplied at 12 may be made in the cycle of operations as desired, the resultant down run water gas passing to the wash box through connection 8, the carburetter, superheater, and connection 31, or through connections 15 and 17, depending on the setting of the various valves. If the down run water gas is passed through the carburetter and superheater it may be carburetted by oil supplied at 19.

Up runs may be made uncarburetted, by supplying steam at 11 and passing the resultant up run water gas, through connections 15 and 17 to the wash box.

My invention, in its broader aspect, includes the following steps which may be widely varied as to their order.

Blasting a fuel bed with air, storing the heat of the blast gases, utilizing the stored heat to vaporize oil and fix the resultant oil vapors, recirculating previously produced reformed oil gas either with or without water gas to serve as a carrier for the oil vapors, and fixed oil gas, passing the mixed oil gas and reformed oil gas through the fuel bed, cracking it therein to produce further reformed oil gas, depositing the excess carbon in the fuel bed, steaming the fuel bed to utilize the excess carbon unconsumed in blasting and to produce water gas, and to keep the fuel bed free and open.

I claim:

1. In a process of manufacturing a mixture of water gas and reformed oil gas, the improvement which consists in increasing the proportion of reformed oil gas in respect to the proportion of water gas generated, which process includes the following steps: air blasting an ignited solid fuel bed, thereby raising a portion of it to incandescence, and burning the air blast gases in a chamber to heat the same; simultaneously admitting oil and previously made gas to the chamber, and causing the previously made gas to carry the resulting oil vapors and oil gas through the entire length of the fuel bed including the incandescent portion, thereby cracking the oil vapors and oil gas and depositing the resulting carbon in the fuel bed; and steaming the fuel bed utilizing the deposited carbon to make water gas.

2. In a process of manufacturing a mixture of water gas and reformed oil gas, the improvement which consists in increasing the proportion of reformed oil gas generated in respect to the proportion of water gas generated; said process including the following steps: air blasting an ignited solid fuel bed, thereby raising a portion of it to incandescence, and burning the blast gases in a chamber to heat the same; simultaneously admitting oil and previously made gas to the chamber thereby causing a mixture composed entirely of previously made gas and oil gas and oil vapors to pass through the entire length of the fuel bed including the incandescent portion, thereby cracking the oil vapors and the oil gas and depositing the resulting carbon in the fuel bed; and steaming the fuel bed utilizing the deposited carbon to make water gas.

EDWIN L. HALL.